US011051008B2

(12) United States Patent
Nakagawa et al.

(10) Patent No.: US 11,051,008 B2
(45) Date of Patent: Jun. 29, 2021

(54) IMAGE PROCESSING APPARATUS AND CONTROL METHOD

(71) Applicant: CANON KABUSHIKI KAISHA, Tokyo (JP)

(72) Inventors: Ryo Nakagawa, Kawasaki (JP); Hirofumi Urabe, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/704,888

(22) Filed: Dec. 5, 2019

(65) Prior Publication Data
US 2020/0186791 A1 Jun. 11, 2020

(30) Foreign Application Priority Data

Dec. 11, 2018 (JP) .............................. JP2018-231828

(51) Int. Cl.
*H04N 17/02* (2006.01)
*H04N 9/64* (2006.01)

(52) U.S. Cl.
CPC ............... *H04N 17/02* (2013.01); *H04N 9/64* (2013.01)

(58) Field of Classification Search
CPC ............... H04N 9/045; H04N 9/04515; H04N 9/04557; H04N 9/646; H04N 9/04555; H04N 9/04559; H04N 9/735; H04N 5/2254; H04N 2209/045; H04N 9/77; H04N 2209/046; H04N 5/37457; H04N 21/4316; H04N 21/47; H04N 5/2624; H04N 5/45; H04N 9/12; H04N 9/73; H04N 5/217; H04N 5/3572; H04N 5/23212; H04N 9/04517; H04N 9/07; H04N 1/6077; H04N 3/155; H04N 5/2173; H04N 5/232125; H04N 5/23229; H04N 5/23293; H04N 5/335; H04N 9/0451; H04N 9/3188; H04N 9/67; H04N 19/12; H04N 19/136; H04N 19/172; H04N 19/30; H04N 19/60; H04N 1/409; H04N 1/60; H04N 1/646; H04N 5/23203; H04N 5/232123; H04N 5/2354; H04N 5/262; H04N 5/2628

See application file for complete search history.

(56) References Cited

U.S. PATENT DOCUMENTS

| | | | | |
|---|---|---|---|---|
| 8,730,343 B2* | 5/2014 | Ishii | ..................... | H04N 1/6088 348/223.1 |
| 2015/0154903 A1* | 6/2015 | Miura | .................. | G09G 3/2003 345/690 |
| 2018/0249182 A1* | 8/2018 | Andrivon | ............... | H04N 19/46 |
| 2019/0052853 A1* | 2/2019 | Yoshida | .................... | H04N 9/77 |

FOREIGN PATENT DOCUMENTS

JP 2018-146949 A 9/2018

* cited by examiner

*Primary Examiner* — Samira Monshi
(74) *Attorney, Agent, or Firm* — Cowan, Liebowitz & Latman, P.C.

(57) ABSTRACT

An image processing apparatus includes: at least one processor and/or at least one circuit to perform operations of the following units: an acquisition unit configured to acquire luminance information that indicates characteristic value of luminance of inputted image data; and a conversion unit configured to convert colors of the image data into conversion colors which are respectively associated with sub-ranges determined by dividing a luminance range of the image data using thresholds, wherein a first threshold of the thresholds is the characteristic value.

14 Claims, 11 Drawing Sheets

FIG.10

| COLOR CONVERSION THRESHOLD Th1 | 4000 |
|---|---|
| COLOR CONVERSION THRESHOLD Th2 | 2000 |
| COLOR CONVERSION THRESHOLD Th3 | 1000 |
| COLOR CONVERSION THRESHOLD Th4 | 400 |
| COLOR CONVERSION THRESHOLD Th5 | 200 |
| COLOR CONVERSION THRESHOLD Th6 | 100 |

IMAGE PROCESSING APPARATUS AND CONTROL METHOD

BACKGROUND OF THE INVENTION

Field of the Invention

The present invention relates to an image processing apparatus and a control method.

Description of the Related Art

Recently opportunities to handle images and videos in a high dynamic range (HDR) are increasing. The standards specified for HDR include gamma curves for the perceptual quantizer (PQ) system and the hybrid log gamma (HLG) system.

An example of HDR is HDR10 stipulated by the Consumer Technology Association (CTA) in the United States. The maximum luminance that HDR10 supports is 10,000 $cd/m^2$. In the case of HDR+, which is a standard on an upgraded HDR10, the maximum luminance of the contents and the maximum luminance of scenes are specified as metadata.

On the site of a video production, the luminance distribution of a video is confirmed in order to determine whether the luminance level of the captured video is as intended by the user. An assist function, to conform the luminance distribution, is a function to convert the input signal into a color in accordance with the luminance and display the color (also called "false color function"). Some display apparatuses (image processing apparatuses) include a false color function. Color conversion is also referred to as "coloring", hence the assist function to convert an input signal into a color in accordance with the luminance and confirm the luminance distribution is also called a "color conversion function" or a "coloring function".

The image processing apparatus according to Japanese Patent Application Publication No. 2018-146949 determines the correspondence between the luminance of the image data that is used for the false color function and the color after the color conversion in accordance with the selected gradation characteristic.

SUMMARY OF THE INVENTION

With the foregoing in view, it is an object of the present invention to provide a technique to identify the luminance included in the image data more accurately.

A first aspect of the present invention is an image processing apparatus, including:

at least one processor and/or at least one circuit to perform operations of the following units:

an acquisition unit configured to acquire luminance information that indicates characteristic value of luminance of inputted image data; and a conversion unit configured to convert colors of the image data into conversion colors which are respectively associated with sub-ranges determined by dividing a luminance range of the image data using thresholds, wherein a first threshold of the thresholds is the characteristic value.

A second aspect of the present invention is a control method, including:

an acquisition step of acquiring luminance information which indicates a characteristic value of luminance of inputted image data; and a conversion step of converting colors of the image data into conversion colors which are respectively associated with sub-ranges determined by dividing a luminance range of the image data using thresholds, wherein a first threshold of the thresholds is the characteristic value.

A third aspect of the present invention is a computer-readable storage medium which stores programs that cause a computer to function, and each unit of the image processing apparatus mentioned above.

Further features of the present invention will become apparent from the following description of exemplary embodiments with reference to the attached drawings.

BRIEF DESCRIPTION OF THE DRAWINGS

FIG. 10 is an example of a default setting of the color conversion thresholds.

DESCRIPTION OF THE EMBODIMENTS

Figure 1:
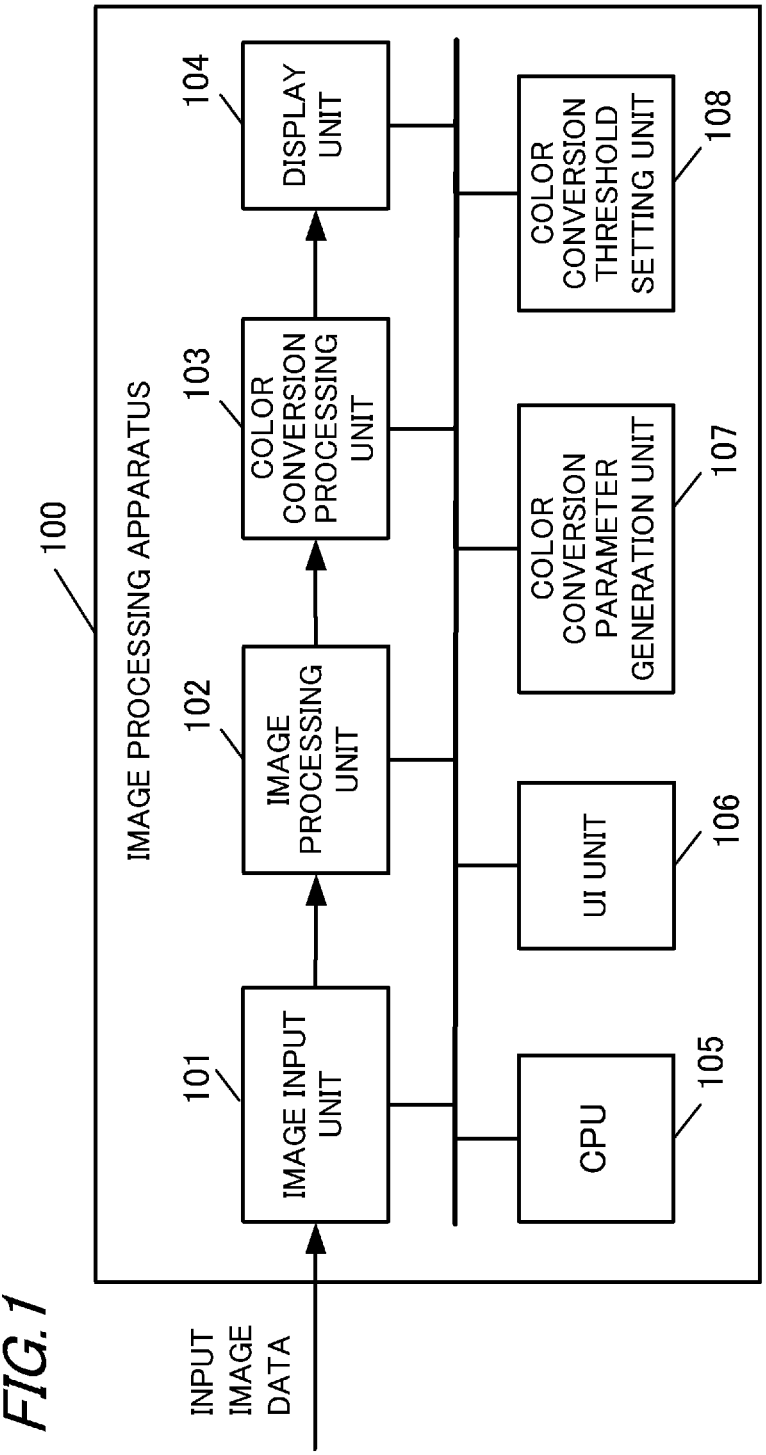
FIG. 1 is a block diagram depicting a configuration of an image processing apparatus according to Embodiment 1 or 2.

Embodiments of the present invention will be described with reference to the drawings. The technical scope of the present invention is determined by the claims, and is not limited by the following embodiments. Further, not all the combinations of characteristics described in the embodiments are essential to the present invention. The contents of the description and the drawings are examples, and are not intended to limit the present invention. Various modifications (including organic combinations of each embodiment) are possible based on the essence of the present invention, and these modifications are not excluded from the scope of the present invention. In other words, each embodiment and modifications thereof are all included in the present invention.

Embodiment 1

In Embodiment 1, color conversion thresholds for false color display are set based on the luminance information which indicates a characteristic value of the luminance of image data in inputted contents (also called "input image data").

The image processing apparatus converts colors of the input image data based on the information associating a conversion color to each of a plurality of luminance ranges (sub-ranges) into which a possible range of a luminance level (luminance range) of the input image data is delimited by the color conversion threshold, and generates an image data displayed in false color.

The luminance information (characteristic value of luminance) includes the maximum luminance (also called Max-CLL) of the input image data, for example. The luminance information may include each luminance of a plurality of images (frames) included in the input image data. The luminance of the frame is the maximum luminance of each frame or the average luminance of each frame, for example.

MaxCLL can be the maximum luminance of each luminance of a plurality of frames, for example. The maximum luminance of each luminance of a plurality of frames may be the maximum luminance of the maximum luminance of each frame or may be the maximum luminance of the average luminance of each frame.

The input image data may be video signals generated in HDR10 format, for example. In this case, the luminance information can be acquired from the metadata attached to the input image data. The metadata includes the maximum luminance of the contents.

The color conversion threshold is the luminance that indicates the breakpoint of the luminance ranges (sub-ranges) corresponding to each of the plurality of conversion colors respectively in the false color display. The image processing apparatus sets the color conversion threshold to a luminance not higher than the maximum luminance of the input image data. This can prevent a plurality of colors from corresponding to a luminance range exceeding the maximum luminance of the input image data. Further, the correspondence between the luminance range and the conversion color can be appropriately set in accordance with the luminance included in the input image data.

FIG. 1 is a block diagram depicting a configuration of an image processing apparatus 100 according to Embodiment 1. The image processing apparatus 100 includes an image input unit 101, an image processing unit 102, a color conversion processing unit 103, a display unit 104, a CPU 105, a user interface (UI) unit 106, a color conversion parameter generation unit 107 and a color conversion threshold setting unit 108.

Image Input Unit

The image input unit 101 acquires input image data and outputs the acquired input image data to the image processing unit 102. The image input unit 101 can acquire input image data from outside the image processing apparatus 100, for example.

The image input unit 101 includes a high definition multimedia interface (HDMI(registered trademark)) input terminal to digitally transfer the image data. It is assumed that the image input unit 101 acquires input image data from outside the image processing apparatus 100 via the HDMI input terminal. The image input unit 101 converts the input image data acquired from outside into image data having a data format that can be processed by the image processing apparatus 100. The image input unit 101 outputs the converted image data to the image processing unit 102. Further, the image input unit 101 outputs the metadata attached to the input image data to the color conversion threshold setting unit 108.

The method of acquiring the input image data by the image input unit 101 is not especially limited. For example, if the image processing apparatus 100 includes a storage unit that stores the image data, the image input unit 101 may acquire the image data stored in the storage unit as the input image data.

Image Processing Unit

The image processing unit 102 determines the gradation characteristic of the input image data outputted from the image input unit 101 in accordance with the user operation to the image processing apparatus 100.

The user operation is an operation to specify the gradation characteristic, for example. The gradation characteristic is, for example, a characteristic related to the correspondence between the gradation value before conversion and the gradation value after conversion in the gradation conversion processing, which is processing to convert the gradation values of the image data. In Embodiment 1, the gradation characteristic of the input image data is assumed to be PQ.

PQ is a gradation characteristic in which the absolute luminance is corresponded to the pixel value of the input image data, and is a gradation characteristic corresponding to HDR. In PQ, the absolute luminances in 0 to 10,000 cd/m$^2$ are defined.

The image processing unit 102 converts the gradation value of the input image data which is outputted from the image input unit 101 in accordance with the determined gradation characteristic (gradation conversion processing). For example, in the gradation conversion processing, the image processing unit 102 converts the gradation value of the input image data using a predetermined lookup table (LUT) which corresponds to the determined gradation characteristics. The predetermined LUT in the gradation conversion processing is 1DLUT (one-dimensional LUT), for example.

The image processing unit 102 may use a predetermined function instead of the predetermined LUT. The image processing unit 102 can generate the processing image data using the predetermined function. The image processing unit 102 outputs the generated processing image data to the color conversion processing unit 103.

Color Conversion Processing Unit

The color conversion processing unit 103 performs color conversion of the processing image data outputted from the image processing unit 102 (also called "color conversion processing") using the color conversion parameters generated by the color conversion parameter generation unit 107, and generates the display image data.

The color conversion processing unit 103 converts the processing image data (contents) outputted from the image processing unit 102 to the conversion color, which corresponds to each luminance range (sub-range) where the luminance of the contents is included. The color conversion processing unit 103 corresponds to the "conversion unit". The luminance of the contents is, for example, the luminance of each pixel of the frame included in the contents, and this pixel is converted into the corresponding conversion color in accordance with the luminance range where each pixel is included.

The color conversion processing unit 103 outputs the generated display image data to the display unit 104. The color conversion parameters are, for example, a table to correspond the luminance range delimited by the color conversion threshold and the conversion color (color after conversion of the color conversion processing). In other words, in the processing image data, the absolute luminance defined by PQ is corresponded to the conversion color by the color conversion parameters.

By referring to the color conversion parameters, the color conversion processing unit 103 can convert the processing image data into a corresponding conversion color based on the absolute luminance (luminance range in which the absolute luminance is included). The color conversion processing unit 103 may generate the display image data by performing the color conversion processing on the input image data, instead of the processing image data.

Display Unit

The display unit 104 displays an image on the screen based on the display image data outputted from the color conversion processing unit 103. The display unit 104 corresponds to the "control unit". The screen for the display unit 104 to display an image corresponds to the "display unit". The display unit 104 is, for example, a self-emitting display panel, or a combination of a light-emitting unit and a modulation panel.

The self-emitting display panel displays an image on the screen by emitting light based on the display image data. The light-emitting unit irradiates light to the modulation panel, and the modulation panel displays an image on the screen by modulating (e.g. transmitting, reflecting) the light emitted from the light-emitting unit, based on the display image data. The light emission (e.g. light emission luminance, light emission color) of the light-emitting unit may be controlled based on the display image data.

In the transmission type liquid crystal display apparatus, the light-emitting unit may be called a "backlight unit", and the modulation panel may be called a "liquid crystal panel". The backlight unit irradiates light to the rear face of the liquid crystal panel. The liquid crystal panel displays an image on the screen by transmitting light emitted from the backlight unit.

CPU

The CPU 105 controls the operation of the image processing apparatus 100. For example, the image processing apparatus 100 includes a storage unit (non-volatile memory) to store programs, and the CPU 105 controls the operation of the image processing apparatus 100 by reading a program from the storage unit and executing the program.

UI Unit

The UI unit 106 receives the user operation, such as the characteristic setting operation, color conversion setting operation, and color conversion threshold setting start operation. The characteristic setting operation is a user operation to specify the gradation characteristic. The color conversion setting operation is a user operation to determine whether the color conversion processing is executed or not. Hereafter the setting, whether the color conversion processing is executed or not (color conversion setting), is also called a "false color setting". The color conversion threshold setting start operation is a user operation to notify the color conversion threshold setting unit 108 of the start of the color conversion threshold setting processing.

Color Conversion Parameter Generation Unit

The color conversion parameter generation unit 107 switches the state of the false color setting between ON and OFF in accordance with the color conversion setting operation by the user. The color conversion processing is executed if the false color setting is ON, and the color conversion processing is not executed if the false color setting is OFF. By selecting the state of the false color setting, the user can select whether the color conversion processing is executed. The color conversion processing unit 103 and the color conversion parameter generation unit 107 can select the state of the false color setting in accordance with the color conversion setting operation by the user.

Figure 11:
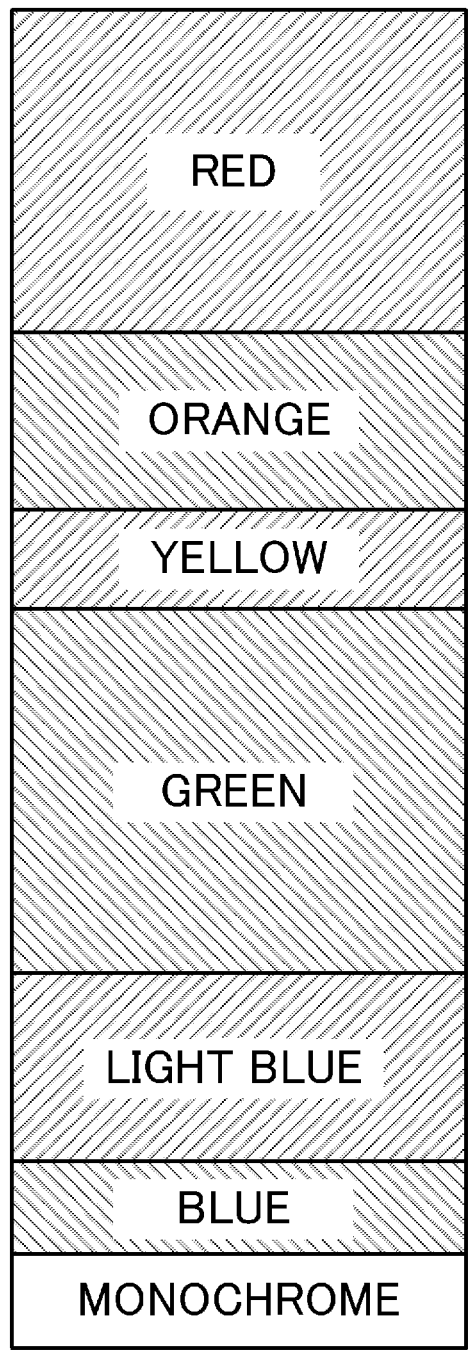
FIG. 11 is an example of correspondence between an absolute luminance and a conversion color based on the color conversion thresholds in FIG. 10.

The color conversion parameter generation unit 107 acquires the color conversion thresholds from the color conversion threshold setting unit 108. The color conversion parameter generation unit 107 generates the color conversion parameters based on the acquired color conversion thresholds and the luminance of the input image data. The color conversion parameters are parameters to convert each luminance range delimited by the color conversion threshold into a conversion color. The color conversion parameters are defined as a table which indicates the correspondence between the luminance range and the conversion color. As illustrated in FIG. 11, which will be described later, each luminance range delimited by each one of a plurality of color conversion thresholds is corresponded to a respective conversion color by the color conversion parameters.

The default color conversion thresholds in the case where the input image data does not include metadata will be described with reference to FIG. 10 and FIG. 11. FIG. 10 is a table indicating the setting of the default color conversion thresholds. In FIG. 10, the color conversion threshold Th1 to the color conversion threshold Th6 are set to the luminance values at each boundary where the conversion color is changed corresponding to the absolute luminance of the input signal respectively.

FIG. 11 is a diagram depicting the correspondence between the absolute luminance and the conversion color within each luminance range delimited by the color conversion thresholds in FIG. 10. In the case of FIG. 11, an input signal in the luminance range where the absolute luminance of the input image data is 0 to 100 $cd/m^2$ is converted into monochrome. The range in which the absolute luminance of the input image data is not less than 100 $cd/m^2$ is divided into a plurality of luminance ranges by the color conversion thresholds in FIG. 10. An input signal having an absolute luminance in each luminance range is converted into a conversion color corresponding to the respective luminance range. By delimiting the plurality of luminance ranges by the color conversion thresholds and converting an input signal into a conversion color that is different depending on the luminance range, the user can easily confirm the luminance distribution of the input signal.

In concrete terms, the color conversion threshold Th1 in FIG. 10 indicates the luminance at the boundary between red and orange in FIG. 11. In the same manner, the color conversion threshold Th2 to the color conversion threshold Th6 indicate the luminance at the boundary between orange and yellow, the boundary between yellow and green, the boundary between green and light blue, the boundary between light blue and blue and the boundary between blue and monochrome in FIG. 11 respectively. In the example in FIG. 10, the luminance values that are set for the color conversion threshold Th1 to the color conversion threshold Th6 are arranged in descending order.

The color conversion parameter generation unit 107 generates the color conversion parameter to convert the color of each pixel of the input image data based on the correspondence between the absolute luminance and the conversion color indicated in FIG. 11. In the example in FIG. 10 and FIG. 11, the color conversion parameter generation unit 107 generates the color conversion parameters to convert the absolute luminance of the input image data as follows. The pixels of which absolute luminance is 10,000 to 4,000 $cd/m^2$ are converted into red, the pixels of which absolute luminance is less than 4,000 to 2,000 $cd/m^2$ into orange, the pixels of which absolute luminance is less than 2,000 to 1,000 cd/m² into yellow, and the pixels of which absolute luminance is less than 1,000 to 400 cd/m² into green. Further, the pixels of which absolute luminance is less than 400 to 200 cd/m² are converted into light blue, the pixels of which absolute luminance is less than 200 to 100 cd/m² into blue, and the pixels of which absolute luminance is less than 100 cd/m² into monochrome.

In a case where the color conversion threshold setting unit 108 changes a color conversion threshold, the color conversion parameter generation unit 107 generates the color conversion parameters based on the color conversion threshold after the change. For example, if the color conversion threshold Th1 is changed to 5,000 cd/m² in the example in FIG. 10, the color conversion parameter generation unit 107 generates color conversion parameters to convert the pixels in 10,000 to 5,000 cd/m² into red, and to convert the pixels in less than 5,000 to 4,000 cd/m² into orange.

In a case where the setting of the false color display is OFF, generation of the color conversion parameters is omitted. Further, the color conversion processing unit 103 omits the color conversion processing for the processed image data which is outputted from the image processing unit 102. Then the processed image data, which is outputted from the image processing unit 102, is outputted to the display unit 104 as the display image data.

Color Conversion Threshold Setting Unit

The color conversion threshold setting unit 108 acquires the luminance information on the luminance from the input image data. The color conversion threshold setting unit 108 corresponds to the "acquisition unit". The luminance information includes the maximum luminance of the input image data, for example, and is used for setting the color conversion threshold.

In the case where the input image data (contents) is displayed by a plurality of conversion colors in accordance with the luminance, the color conversion threshold setting unit 108 sets each color conversion threshold which indicates the boundary of the luminance range corresponding to each conversion color based on the luminance information. The color conversion threshold setting unit 108 can set the color conversion threshold based on the maximum luminance MaxCLL of the contents, for example. The color conversion threshold setting unit 108 may set the color conversion threshold to the maximum luminance MaxCLL or less of the contents. The color conversion threshold setting unit 108 corresponds to the "setting unit".

In the case where the color conversion threshold setting start notice is received from the UI unit 106, or in the case where the MaxCLL included in the metadata outputted by the image input unit 101 changes, the color conversion threshold setting unit 108 sets the color conversion thresholds for the false color display based on the MaxCLL.

The color conversion parameter generation unit 107 generates the color conversion parameters based on the color conversion thresholds after the setting. The color conversion threshold setting unit 108 can store the settings of the color conversion thresholds in the storage unit included in the image processing apparatus 100. In the example described in Embodiment 1, as illustrated in FIG. 10, six color conversion thresholds are set, and the luminance of the input image data is divided into six luminance ranges. The number of color conversion thresholds is not limited to six and may be more or less than six as long as different colors are corresponded to the luminance ranges respectively.

Color Conversion Threshold Setting Processing According to Embodiment 1

Figure 2:
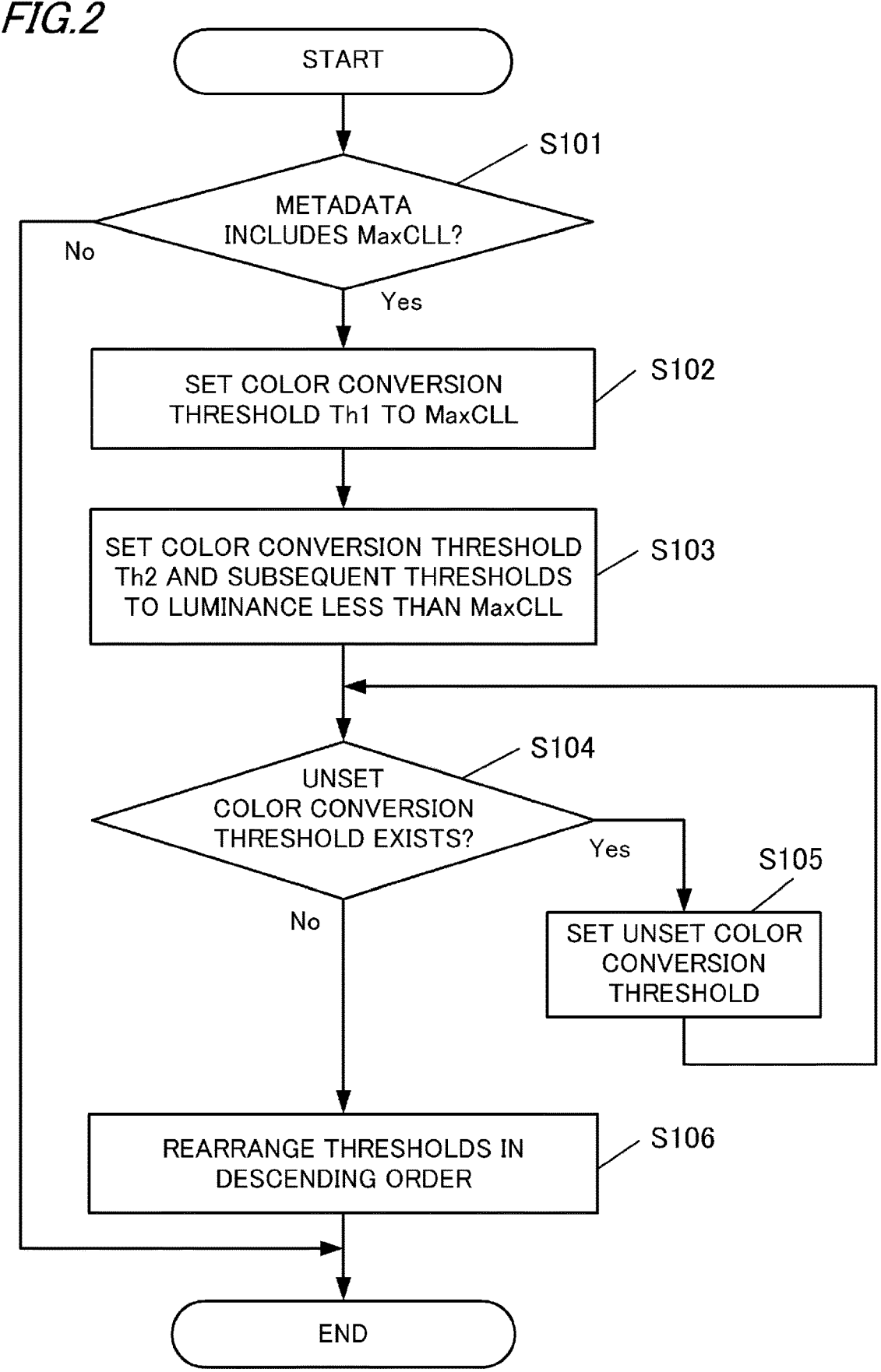
FIG. 2 is an example of a color conversion threshold setting processing flow according to Embodiment 1.

The color conversion threshold setting processing for the false color display according to Embodiment 1 will be described with reference to the flow chart in FIG. 2. In FIG. 2, it is assumed that the maximum luminance MaxCLL of the input image data (hereafter "contents") is 2,000 cd/m². A number of color conversion thresholds is assumed to be six.

In step S101, the color conversion threshold setting unit 108 determines whether MaxCLL is included in the metadata. If MaxCLL is not included in the metadata (No in S101), the color conversion threshold setting unit 108 does not set the color conversion thresholds, and processing ends. If MaxCLL is included in the metadata (Yes in S101), processing advances to step S102.

In step S102, the color conversion threshold setting unit 108 sets the color conversion threshold Th1 to MaxCLL, which is 2,000 cd/m², and processing advances to step S103.

In step S103, the color conversion threshold setting unit 108 sets the luminances less than MaxCLL (less than the maximum luminance) in the reference luminances in descending order from the higher luminance, for the color conversion thresholds Th2 and subsequent thresholds. The reference luminances are a plurality of luminance values which are determined as a reference to set the color conversion thresholds. The reference luminances are, for example, six luminances: 4,000, 2,000, 1,000, 400, 200 and 100 cd/m². In the example in FIG. 2, MaxCLL is 2,000 cd/m², hence there are four luminances less than MaxCLL, that is, 1,000, 400, 200 and 100 cd/m². The color conversion threshold setting unit 108 sets the four luminances: 1,000, 400, 200 and 100 cd/m² for the color conversion threshold Th2 to the color conversion threshold Th5 respectively.

In the above-mentioned reference luminances, 4,000 cd/m² is the maximum luminance that is used as the reference in an HDR movie studio, for example. 2,000 cd/m² is the maximum luminance of a high-end liquid crystal TV, for example. 1,000 cd/m² is the maximum luminance of a display specified by Display HDR 1,000, for example. 400 cd/m² is the maximum luminance of a standard TV, for example. 200 cd/m² is the maximum luminance of a standard PC monitor, for example. 100 cd/m² is a boundary between the standard dynamic range (SDR) and HDR, for example. These luminances are for the user to implement as references.

By the processing in step S103, the color conversion threshold Th2 is set to 1,000 cd/m², the color conversion threshold Th3 is set to 400 cd/m², the color conversion threshold Th4 is set to 200 cd/m², and the color conversion threshold Th5 is set to 100 cd/m². Then processing advances to step S104.

In step S104, the color conversion threshold setting unit 108 determines whether there is a threshold of which value is not set (also called "unset color conversion threshold") in the six color conversion thresholds. Processing advances to step S106 if there is no unset color conversion threshold (No in S104). Processing advances to step S105 if there is an unset color conversion threshold (Yes in S104).

In the example described in FIG. 2, five color conversion thresholds: Th1 to Th5, out of the six color conversion thresholds, are set by the processings up to step S103. In step S104, the color conversion threshold Th6 is in the unset state. Processing advances to step S105 since the color conversion threshold Th6 is not set.

In step S105, the color conversion threshold setting unit 108 sets one of the unset color conversion thresholds to a luminance determined by dividing the widest luminance range not more than MaxCLL. For example, the color conversion threshold setting unit 108 may set the unset color conversion threshold to a luminance determined by equally dividing the widest luminance range or by dividing the widest luminance range at a predetermined ratio.

In the example described in FIG. 2, 2,000, 1,000, 400, 200 and 100 cd/m² are set for the color conversion threshold Th1 to the color conversion threshold Th5 respectively. The widest luminance range not more than MaxCLL (2,000 cd/m²) is the luminance range between the color conversion threshold Th1 and the color conversion threshold Th2 (1,000 to 2,000 cd/m²). For the unset color conversion threshold Th6, the color conversion threshold setting unit 108 sets 1,500 cd/m² determined by equally dividing the luminance range 1,000 to 2,000 cd/m² between the color conversion threshold Th1 and the color conversions threshold Th2.

Then processing returns to step S104 again. In the example described in FIG. 2, processing advances to set S106 since there is no unset color conversion threshold besides the color conversions threshold Th6. If there is still an unset color conversion threshold after processing returns to S104, on the other hand, processing advances to step S105 again. The color conversion threshold setting unit 108 determines the widest luminance range not more than MaxCLL at this point. The color conversion threshold setting unit 108 sets the unset color conversion threshold to a luminance determined by equally dividing the widest luminance range or by dividing the widest luminance range at a predetermined ratio.

If there are a plurality of unset color conversion thresholds, the color conversion threshold setting unit 108 repeats the processings in steps S104 and S105, so that the unset color conversion thresholds are set one at a time, but the present invention is not limited to this. For example, in step S105, the color conversion threshold setting unit 108 may set the plurality of unset color conversion thresholds to luminances determined by dividing the widest luminance range or equally in accordance with the number of unset color conversion thresholds.

In step S106, the color conversion threshold setting unit 108 rearranges from the color conversion threshold Th1 to the color conversion threshold Th6, that are set as above in descending order. In the case of the example described in FIG. 2, the color conversion threshold Th1 to the color conversion threshold Th6 are set to 2,000, 1,500, 1,000, 400, 200 and 100 cd/m², and the color conversion threshold setting processing ends.

Figure 3:
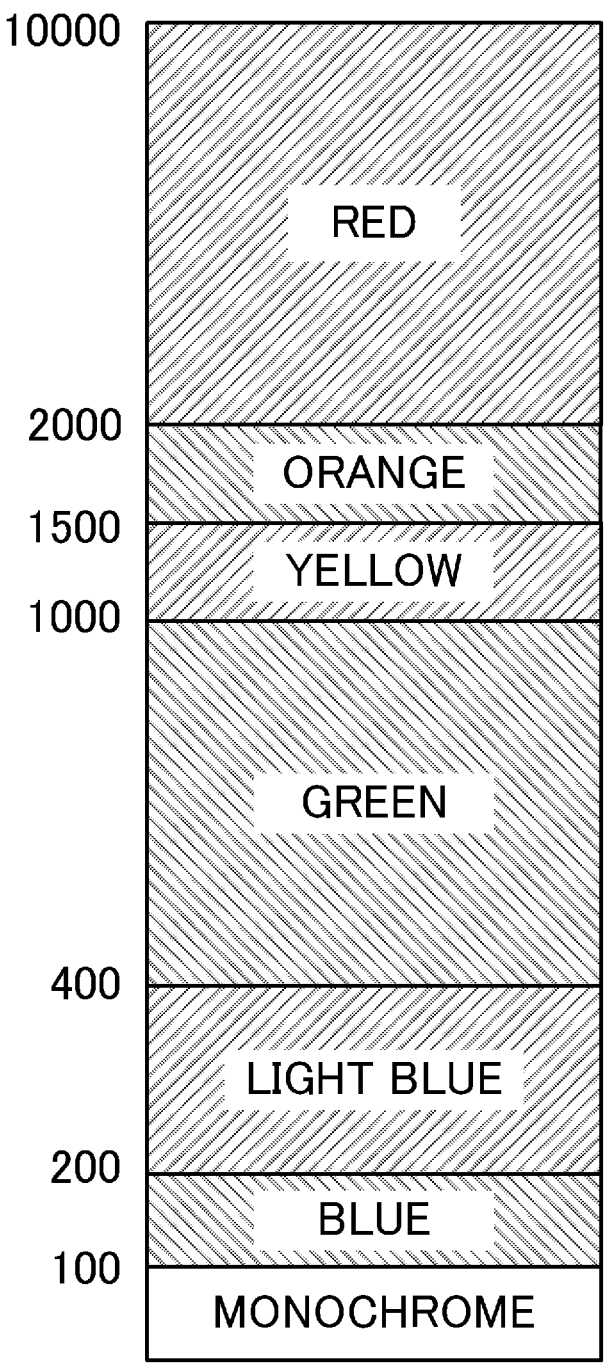
FIG. 3 is an example of correspondence between an absolute luminance and a conversion color according to Embodiment 1.

In a case where the color conversion thresholds are set in the color conversion threshold setting processing, the color conversion parameter generation unit 107 generates the correspondence between the absolute luminance and the conversion color included in each luminance range as color conversion parameters. FIG. 3 indicates the correspondence of the absolute luminance and the conversion color in the case of the example described in FIG. 2.

An example in the case where MaxCLL is 4,000 cd/m² in the color conversion threshold setting processing in FIG. 2 will be described. In step S102, the color conversion threshold Th1 is set to 4,000 cd/m². In step S103, the color conversion threshold setting unit 108 sets the color conversion thresholds of the color conversion threshold Th2 and subsequent thresholds to 2,000, 1,000, 400, 200 and 100 cd/m², which are luminances less than MaxCLL. In other words, the color conversion threshold Th2 is set to 2,000 cd/m², the color conversion threshold Th3 is set to 1,000 cd/m², the color conversion threshold Th4 is set to 400 cd/m², the color conversion threshold Th5 is set to 200 cd/m², and the color conversion threshold Th6 is set to 100 cd/m².

If it is determined that there is no unset color conversion threshold in step S104, and processing advances to step S106. The color conversion threshold Th1 to the color conversion threshold Th6 are now 4,000, 2,000, 1,000, 400, 200 and 100 cd/m² respectively.

An example in the case where MaxCLL is 6,000 cd/m² in the color conversion threshold setting processing in FIG. 2 will be described. In step S102, the color conversion threshold Th1 is set to 6,000 cd/m². In step S103, the color conversion threshold setting unit 108 sets the color conversion thresholds of the color conversion threshold Th2 and subsequent thresholds to 4,000, 2,000, 1,000, 400 and 200 cd/m², which are luminances less than MaxCLL. In other words, the color conversion threshold Th2 is set to 4,000 cd/m², the color conversion threshold Th3 is set to 2,000 cd/m², the color conversion threshold Th4 is set to 1,000 cd/m², the color conversion threshold Th5 is set to 400 cd/m², and the color conversion threshold Th6 is set to 200 cd/m².

If it is determined that there is no unset color conversion threshold in step S104, processing advances to step S106. The color conversion threshold Th1 to the color conversion threshold Th6 are now 6,000, 4,000, 2,000, 1,000, 400 and 200 cd/m² respectively.

According to Embodiment 1 described above, the image processing apparatus 100 sets the color conversion thresholds for the false color display in accordance with the maximum luminance of the contents and the reference luminances in a range not more than the maximum luminance of the contents. The image processing apparatus 100 can perform the color conversion in accordance with the luminances included in the contents, using the color conversion thresholds that are set. By the display image data of which colors are converted by the image processing apparatus 100, the user can identify the luminance distribution more accurately. Further, the image processing apparatus 100 sets the color conversion thresholds for the false color display, hence the user need not set the color conversion thresholds.

In the description on Embodiment 1, the reference luminances are assumed to be 4,000, 2,000, 1,000, 400, 200 and 100 cd/m², but reference luminances may include different luminances. For example, in the case of confirming whether the luminance of each pixel of the contents exceeds 600 cd/m² or not, the reference luminances may be 4,000, 2,000, 1,000, 600, 200 and 100 cd/m².

In Embodiment 1, a number of luminances included in the reference luminance s is six, and a number of color conversion thresholds is six, but a number of luminances included in the reference luminances and a number of color conversion thresholds are not especially limited. For example, a number of luminances included in the reference luminances may be three, and a number of color conversion thresholds may be five.

In the case of the flow chart in FIG. 2 of Embodiment 1, the image processing apparatus 100 determines whether the color conversion threshold setting processing is executed or not is determined depending on whether MaxCLL is included in the metadata or not, but the present invention is not limited to this. The image processing apparatus 100 may set the color conversion thresholds in accordance with the maximum luminance of the contents set by the user, without determining whether MaxCLL is included in the metadata.

Embodiment 2

In Embodiment 2, the image processing apparatus sets the color conversion thresholds for the false color display based on the maximum luminance of the input image data (contents) and the maximum luminance of a plurality of scenes included in the contents. The luminance information includes each maximum luminance of the plurality of scenes. For example, in the case of HDR10+, the maximum luminance of the scene (hereafter Scene-MaxCLL) is included in the metadata. The maximum luminance of the scene is set to a different value for each scene.

In Embodiment 2, a case where the color conversion thresholds for the false color display are set, interlocking with both MaxCLL and Scene-MaxCLL included in the metadata, will be described. In a case where MaxCLL or Scene-MaxCLL included in the metadata attached to the contents is changed, the image processing apparatus 100 sets the color conversion thresholds based on the current maximum luminance after the change. Therefore, the user can recognize the luminance distribution in each scene of the contents more accurately.

In Embodiment 2, if metadata is not included in the contents, the image processing apparatus refers to the color conversion thresholds in FIG. 10 and the correspondence between the absolute luminance and the conversion color in FIG. 11 as the default setting, just like Embodiment 1.

In Embodiment 2, the image processing apparatus sets six color conversion thresholds, and generates and sets one more color conversion threshold Th7 in the same manner as Embodiment 1. In a case where the color conversion threshold Th7 is set, the conversion colors corresponding to the range from the maximum luminance MaxCLL, which is set for the color conversion threshold Th1, to the luminance which is set for the color conversion threshold Th7, are changed to pink.

Color Conversion Threshold Setting Processing According to Embodiment 2

Figure 4:
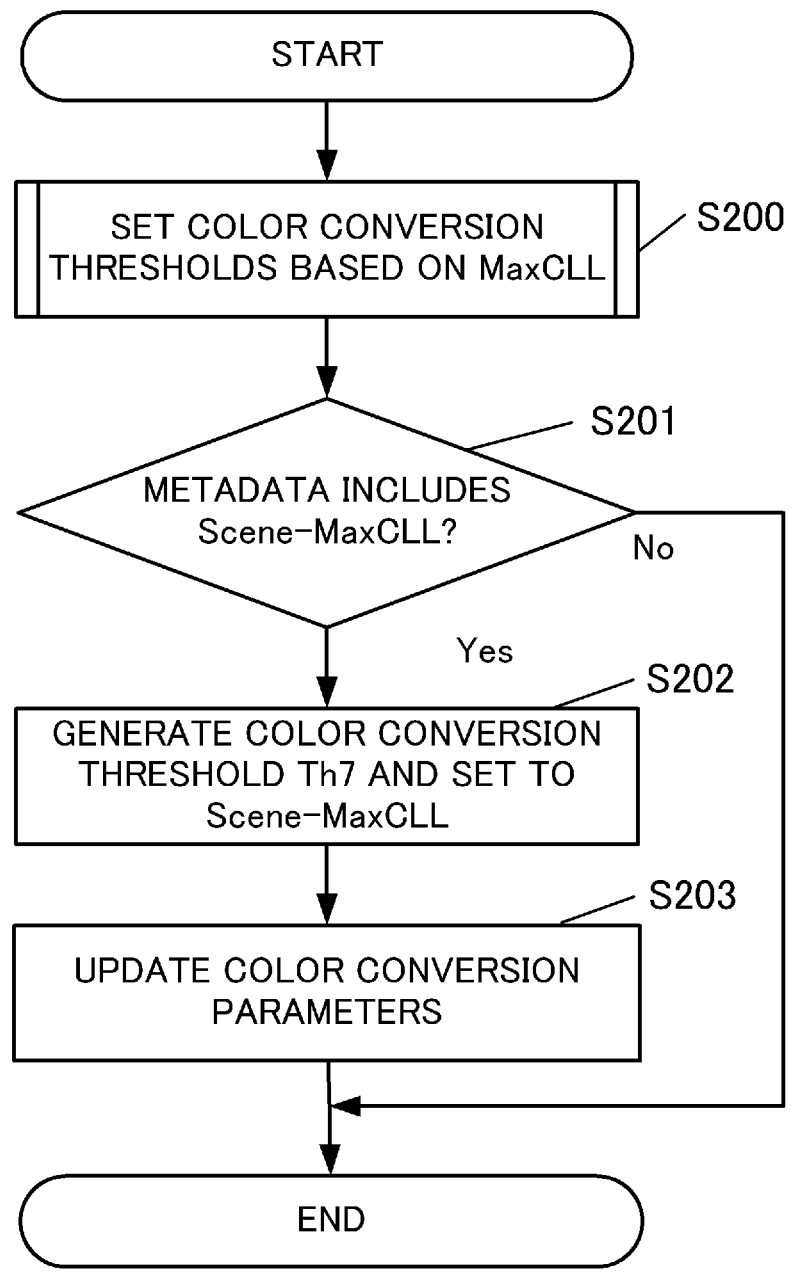
FIG. 4 is an example of a color conversion threshold setting processing flow according to Embodiment 2.

The color conversion threshold setting processing for the false color display according to Embodiment 2 will be described with reference to the flow chart in FIG. 4. A processing the same as Embodiment 1 is denoted with the same reference sign, and description thereof is omitted. In FIG. 4, it is assumed that the maximum luminance of the contents is 2,000 cd/m$^2$, and the maximum luminance of the scene Scene-MaxCLL is 1,000 cd/m$^2$. A number of initial values of the color conversion thresholds is assumed to be six.

In step S200, the color conversion threshold setting unit 108 sets the color conversion thresholds based on MaxCLL in the same manner as Embodiment 1. The processing in step S200 is the same as step S101 to step S106 in FIG. 2, hence description thereof is omitted. By the processing in step S200, the color conversion threshold Th1 to the color conversion threshold Th6 are set to 2,000 cd/m$^2$, 1,500 cd/m$^2$, 1,000 cd/m$^2$, 400 cd/m$^2$, 200 cd/m$^2$ and 100 cd/m$^2$ respectively. The correspondence between the absolute luminance and the conversion color in this case is the same as the correspondence in FIG. 3. Then processing advances to step S201.

In step S201, the color conversion threshold setting unit 108 determines whether Scene-MaxCLL is included in the metadata. If Scene-MaxCLL is not included in the metadata (No in S201), the color conversion threshold setting unit 108 does not change the setting in step S200, and processing ends. If Scene-MaxCLL is included in the metadata (Yes in S201), processing advances to step S202.

In step S202, the color conversion threshold setting unit 108 generates a new color conversion threshold Th7. The color conversion threshold setting unit 108 sets the color conversion threshold Th7 to 1,000 cd/m$^2$, which is Scene-MaxCLL (the maximum luminance value of the display target scene). By the processing in step S202, the color conversion threshold Th1 to the color conversion threshold Th7 are set to 2,000, 1,500, 1,000, 400, 200, 100 and 1,000 cd/m$^2$ respectively. The color conversion threshold setting unit 108 rearranges the color conversion threshold Th1 to the color conversion threshold Th7 that are set. The color conversion thresholds after rearrangement become the color conversion threshold Th1 (2,000), the color conversion threshold Th2 (1,500), the color conversion thresholds Th3 and Th7 (1,000), the color conversion threshold Th4 (400), the color conversion threshold Th5 (200) and the color conversion threshold Th6 (100).

Figure 5:
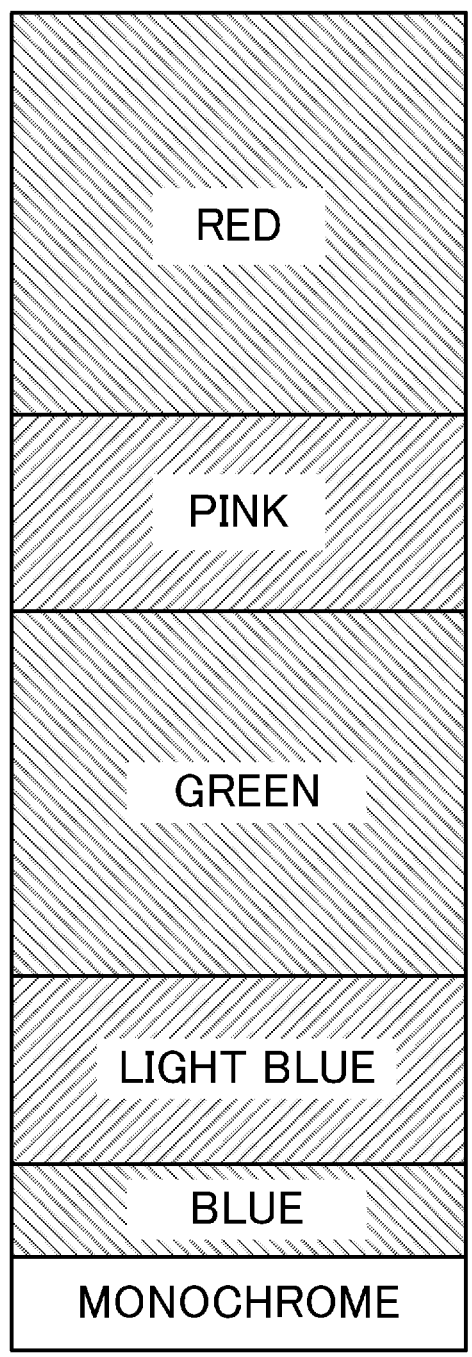
FIG. 5 is an example of correspondence between an absolute luminance and a conversion color according to Embodiment 2.

In step S203, the color conversion parameter generation unit 107 corresponds the luminance range from the color conversion threshold Th1 (2,000 cd/m$^2$) to the color conversion threshold Th 7 (1,000 cd/m$^2$) to pink. FIG. 5 indicates the correspondence between the absolute luminance and the conversion color in the example described in FIG. 4.

In the example in FIG. 5, the color conversion threshold Th2 (1,500 cd/m$^2$) and the color conversion threshold Th3 (1,000 cd/m$^2$) are in an unused state. Therefore, the color conversion threshold setting unit 108 may determine that the color conversion threshold Th2 and the color conversion threshold Th3 are unset and may set the color conversion threshold Th2 and the color conversion threshold Th3 to values less than Scene-MaxCLL by the same processing as in steps S104 and S105 in the flow chart in FIG. 2. For example, the color conversion threshold setting unit 108 sets the color conversion threshold Th2 to 700 cd/m$^2$ determined by equally dividing the maximum luminance range from the color conversion threshold Th7 (1,000 cd/m$^2$) to the color conversion threshold Th4 (400 cd/m$^2$). Further, the color conversion threshold setting unit 108 may set the color conversion threshold Th2 and the color conversion threshold Th3 to 800 cd/m$^2$ and 600 cd/m$^2$ respectively by equally dividing the maximum luminance range by the two thresholds.

According to Embodiment 2 described above, the image processing apparatus 100 sets the color conversion thresholds for the false color display based on the maximum luminance of the contents, just like Embodiment 1. Further, the image processing apparatus 100 sets the color conversion thresholds in accordance with the maximum luminance of the scene. Thereby the user can identify the luminance distribution of each scene of the contents more accurately.

In the case of the flow chart in FIG. 4 of Embodiment 2, the image processing apparatus 100 determines whether MaxCLL and Scene-MaxCLL are included in the metadata or not. Depending on this determination result, the image processing apparatus 100 determines whether the color conversion threshold setting processing is executed or not, but the present invention is not limited to this. The image processing apparatus 100 may set the color conversion thresholds in accordance with the maximum luminance of the contents and the maximum luminance of the scene that are set by the user, without determining whether MaxCLL and Scene-MaxCLL are included in the metadata.

Embodiment 3

In Embodiment 3, the image processing apparatus sets the color conversion thresholds for the false color display based on the luminance information acquired by analyzing the input image data, instead of using the metadata or the luminances that are set by the user.

Figure 6:
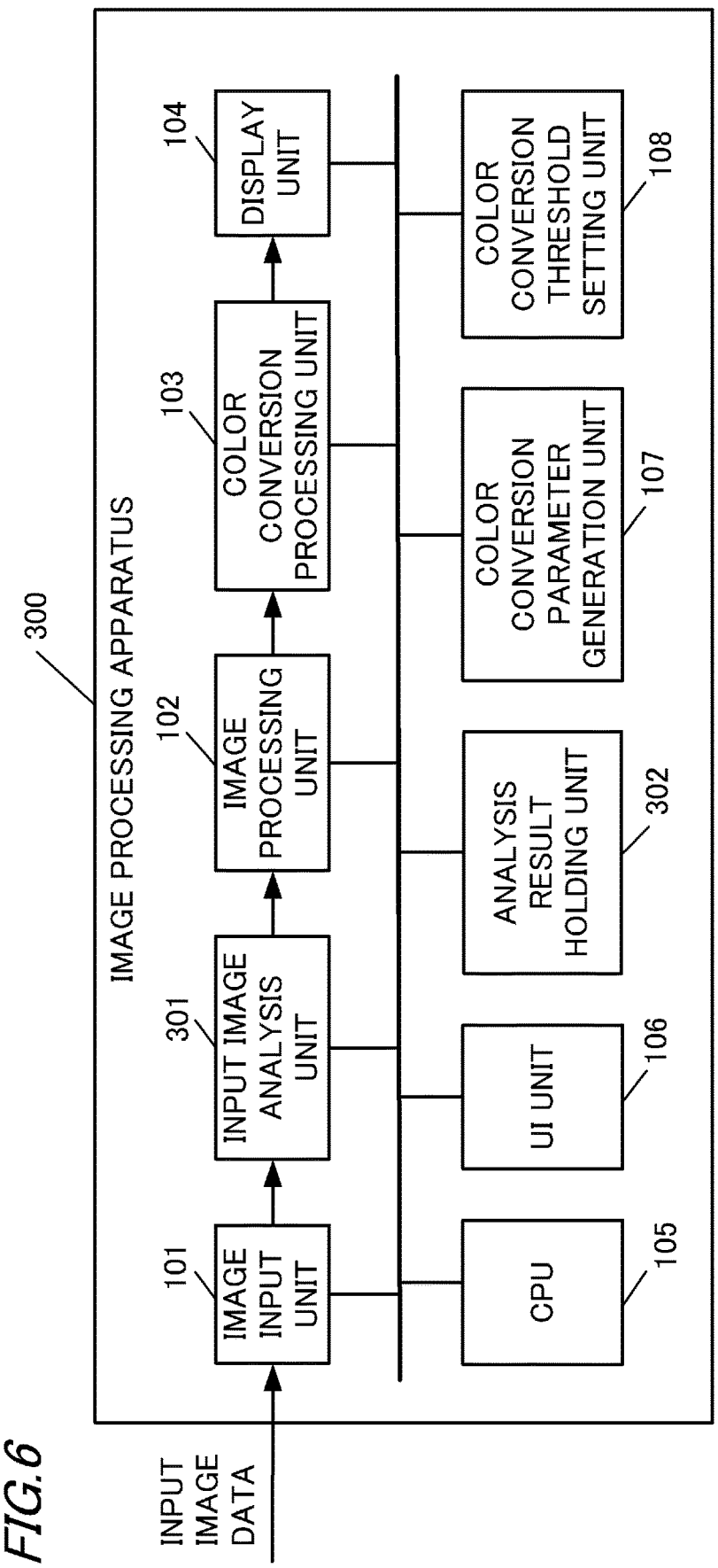
FIG. 6 is a block diagram depicting a configuration of an image processing apparatus according to Embodiment 3.

FIG. 6 is a block diagram depicting an example of a configuration of an image processing apparatus 300 according to Embodiment 3. A composing element that performs the same processing as Embodiment 1 is denoted with the same reference sign, and description thereof is omitted.

The image processing apparatus 300 includes an image input unit 101, an input image analysis unit 301, an image processing unit 102, a color conversion processing unit 103, a display unit 104, a CPU 105, a UI unit 106, a color conversion parameter generation unit 107, an analysis result holding unit 302 and a color conversion threshold setting unit 108.

Input Image Analysis Unit

The input image analysis unit 301 analyzes the input image data outputted by the image input unit 101, and acquires the luminance information. The input image analysis unit 301 analyzes the input image data for each frame, for example, and acquires the maximum luminance (also called frame light level (FLL)) of each frame. The input image analysis unit 301 outputs the acquired FLL to the analysis result holding unit 302 as the analysis information. The input image analysis unit 301 outputs the input image data after the analysis to the image processing unit 102.

Figure 7A:
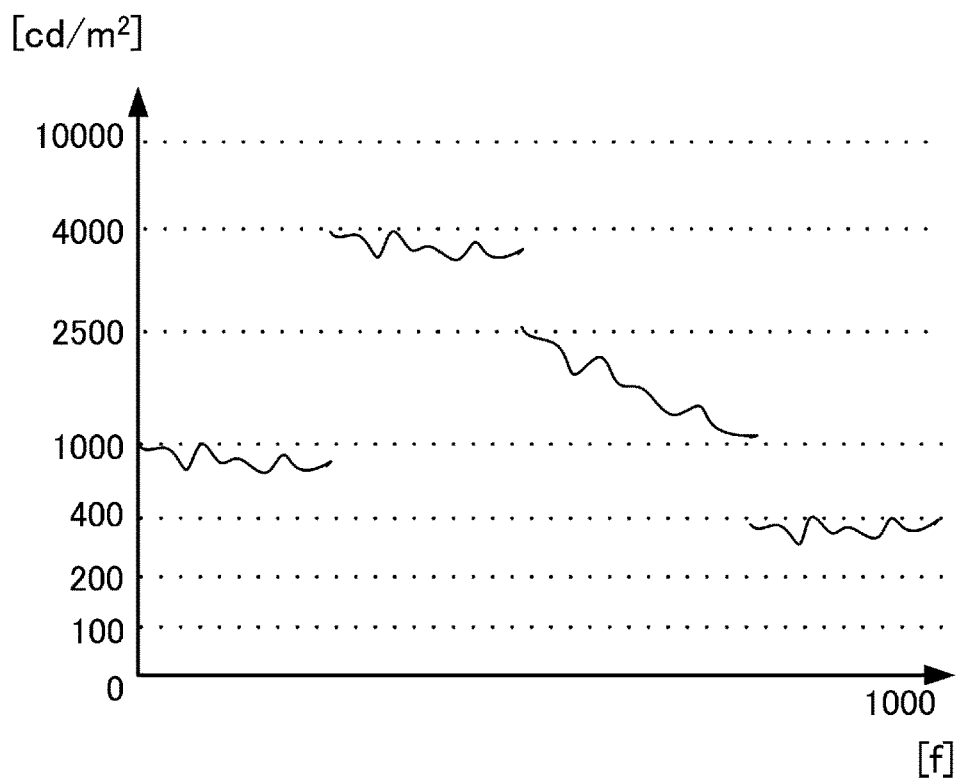
FIGS. 7A and 7B are graphs plotting the maximum luminance for each frame.

FIG. 7A is an example of a graph generated by plotting the FLL of each frame included in the input image data according to Embodiment 3. In concrete terms, FIG. 7A is an example when 1,000 FLLs acquired by the input image analysis unit 301 from the point immediately after the start of the contents are plotted in a timer series.

FLL is distributed almost horizontally at around 1,000 cd/m² after the start of the contents. Then FLL rises to about 4,000 cd/m² and is distributed almost horizontally at around 4,000 cd/m² at its peak. Then FLL drops to about 2,500 cd/m² and gradually decreases from 2,500 cd/m². Then FLL drops to about 400 cd/m² and is distributed almost horizontally at around 400 cd/m². In the example in FIG. 7A, the input image analysis unit 301 can analyze that the maximum value of FLLs (hereafter MaxFLL) of 1,000 frames is 4,000 cd/m².

Analysis Result Holding Unit

The analysis result holding unit 302 holds the FLL of each frame, which the input image analysis unit 301 acquired by analyzing the input image data, as the analysis information. For example, in the case where the input image analysis unit 301 analyzes 1,000 frames of input image data, 1,000 FLLs are held in the analysis result holding unit 302.

Color Conversion Threshold Setting Unit

In a case where a color conversion threshold setting start notice is received from the UI unit 106, the color conversion threshold setting unit 108 sets the color conversion thresholds based on the analysis information generated by analyzing the luminances of the frames included in the input image data.

In concrete terms, the color conversion threshold setting unit 108 acquires the FLL of each frame stored in the analysis result holding unit 302. Based on the acquired FLLs, the color conversion threshold setting unit 108 sets the color conversion thresholds for the false color display.

Color Conversion Threshold Setting Processing According to Embodiment 3

Figure 8:
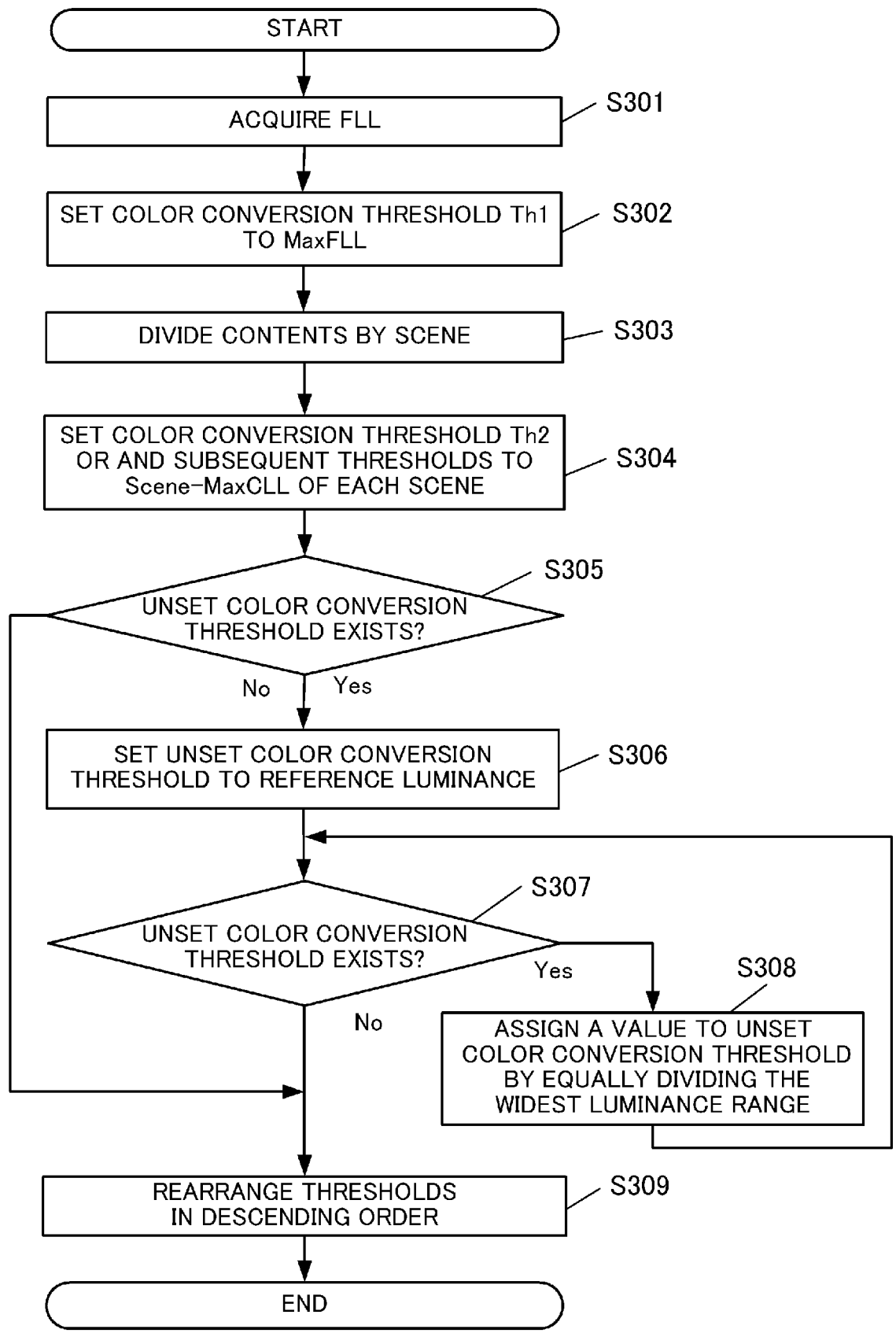
FIG. 8 is an example of a color conversion threshold setting processing flow according to Embodiment 3.

The color conversion threshold setting processing according to Embodiment 3 will be described with reference to the flow chart in FIG. 8. In Embodiment 3, it is assumed that a number of color conversion thresholds is six, and that the luminance of the input image data is divided into seven luminance ranges, just like Embodiment 1.

First in step S301, the color conversion threshold setting unit 108 acquires FLLs held by the analysis result holding unit 302. Then processing advances to step S302.

In step S302, the color conversion threshold setting unit 108 sets the color conversion threshold Th1 to the maximum value MaxFLL of the FLLs acquired in step S301. In the example in FIG. 7A, MaxFLL is 4,000 cd/m². Then processing advances to step S303.

In step S303, the color conversion threshold setting unit 108 divides the contents into a plurality of scenes. For example, the color conversion threshold setting unit 108 may divide the contents into scenes based on the change amount of the maximum luminance FLL of each frame. Here a method of dividing the contents into a plurality of scenes will be described with reference to FIG. 7B.

Figure 7B:
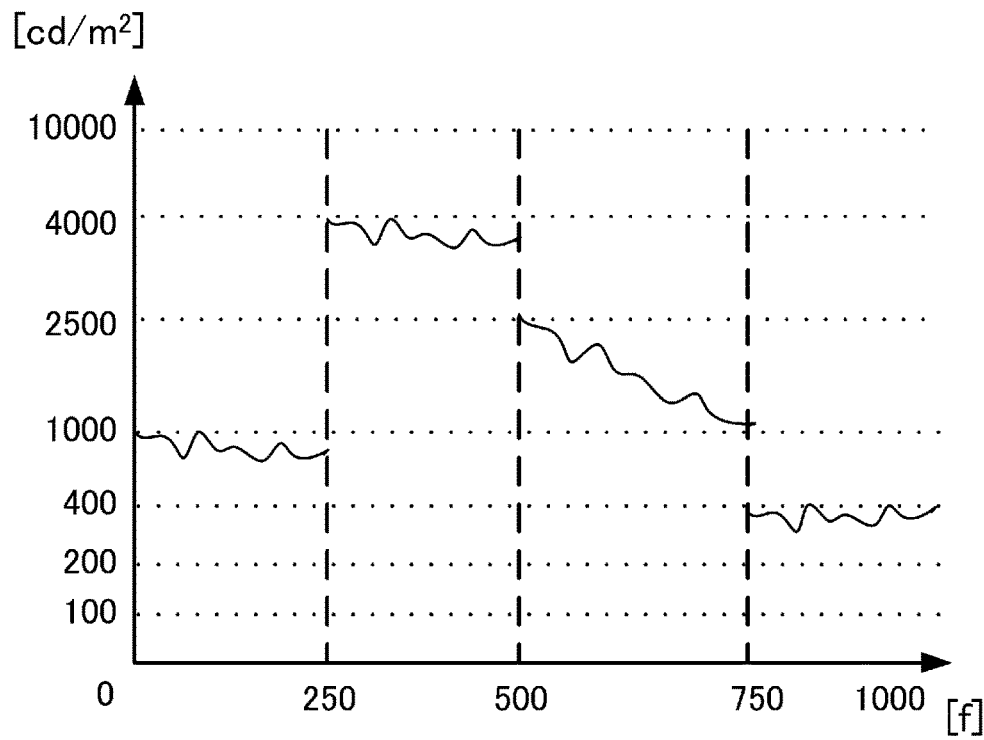

FIG. 7B is a graph generated by plotting 1,000 FLLs, just like FIG. 7A. The color conversion threshold setting unit 108 analyzes the FLLs acquired in step S301 and delimits the scenes at the section between continuous frames, of which difference of respective FLLs is larger than a predetermined threshold.

First, the color conversion threshold setting unit 108 captures the FLL of the analysis target frame and the FLL of the previous frame of the analysis target frame, and calculates the difference of the FLLs between these frames. The color conversion threshold setting unit 108 determines whether the calculated difference is larger than the predetermined threshold. In Embodiment 3, the predetermined threshold is assumed to be 100 cd/m². In the example in FIG. 7B, the difference from the previous frame exceeds the predetermined threshold 100 cd/m² at the 250th, 500th and 750th frame. Therefore, the color conversion threshold setting unit 108 delimits the contents at sections immediately before the 250th, 500th and 750th frame, so as to divide the contents into four scenes. The maximum luminances of the four scenes (hereafter Scene-MaxFLL) are 1,000 cd/m², 4,000 cd/m², 2,500 cd/m² and 400 cd/m².

In step S304, the color conversion threshold setting unit 108 sets the color conversion threshold Th2 and the subsequent thresholds to the Scene-MaxFLL of each scene excluding MaxFLL. By the processing in step S304, the color conversion threshold Th2 is set to 400 cd/m², the color conversion threshold Th3 to 2,500 cd/m², and the color conversion threshold Th4 to 1,000 cd/m². The sequence of setting the color conversion threshold Th2 and the subsequent thresholds to each Scene-MaxFLL may be arbitrary, since the color conversion thresholds are rearranged in descending order in a later processing. Then processing advances to step S305.

In step S305, the color conversion threshold setting unit 108 determines whether there is an unset color conversion threshold. Processing advances to step S309 if there is no unset color conversion threshold (No in S305). Processing advances to step S306 if there is an unset color conversion threshold (Yes in S305). In the example described in FIG. 8, the color conversion threshold Th5 and the color conversion threshold Th6, out of the six color thresholds, are in the unset state, hence processing advances to step S306.

In step S306, the color conversion threshold setting unit 108 selects and sets the unset color conversion thresholds in the sequence of lower reference luminance. It is assumed that a number of reference luminances is six, which is the same as Embodiments 1 and 2. The color conversion threshold Th1 to the color conversion threshold Th4 are set to 4,000, 400, 2,500 and 1,000 cd/m², therefore the unset color conversion thresholds are set to 200 cd/m² and 100 Cd/m², which are lower than these color conversion thresholds. By the processing in step S306, the color conversion threshold Th5 is set to 100 cd/m², and the color conversion threshold Th6 is set to 200 cd/m². Then processing advances to step S307.

In step S307, the color conversion threshold setting unit 108 determines whether there is an unset color conversion threshold. Processing advances to step S309 if there is no unset color conversion threshold (No in S307). Processing advances to step S308 if there is an unset color conversion threshold (Yes in S307). A possible case where there is an unset color conversion threshold is that one of color conversion threshold Th1 to color conversions threshold Th4 is set to 200 cd/m² in step S306. In this case, only the reference luminance lower than 200 cd/m² is 100 cd/m2, and the color conversion threshold Th5 is set to 100 cd/m². Then processing advances to step S308, since the color conversion threshold Th6 exists as an unset color conversion threshold.

In step S308, the color conversion threshold setting unit 108 sets an unset color conversion threshold to a luminance determined by equally dividing the widest luminance range not more than MaxFLL. If there are a plurality of unset color conversion thresholds, the color conversion threshold setting unit 108 may set each of these unset color conversion thresholds to a luminance determined by equally dividing the widest luminance range by a number of unset color conversion thresholds. Then processing advances to step S307 again. Thereafter processing advances to step S309 since all of the six color conversion thresholds are set by the processings up to step S306.

Figure 9:
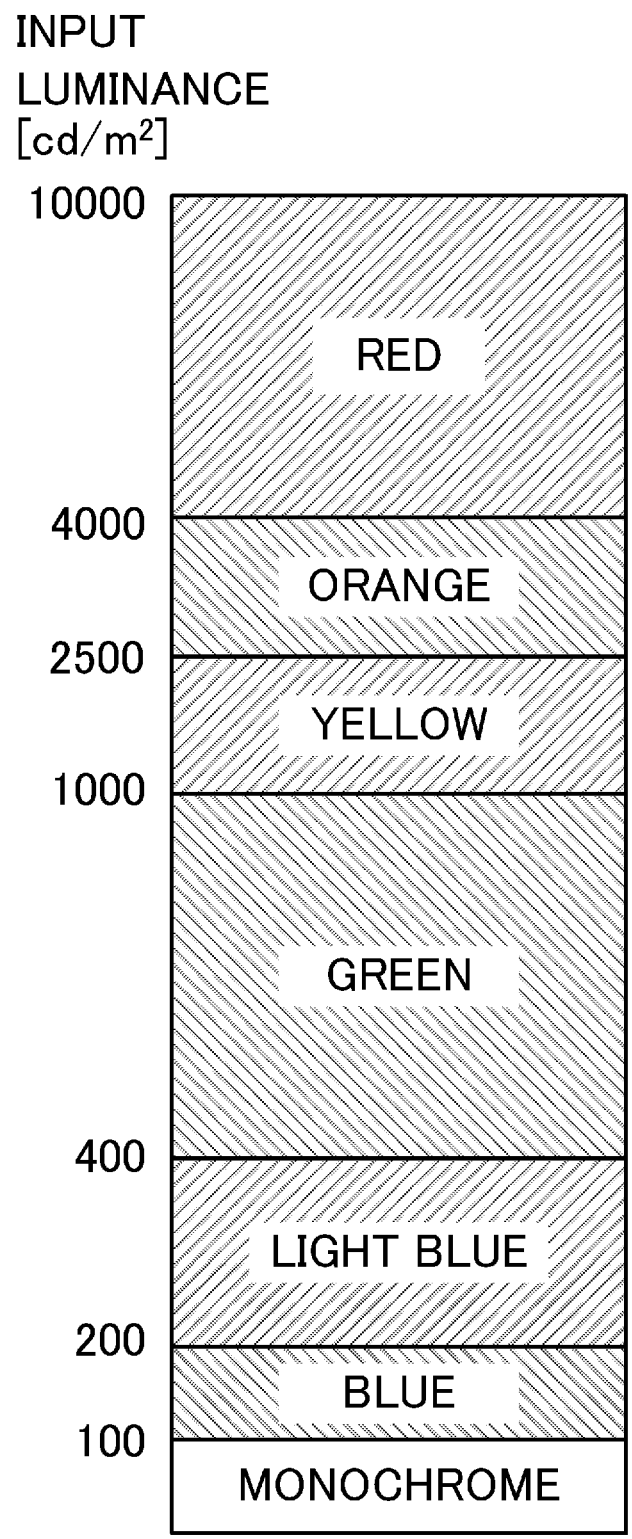
FIG. 9 is an example of correspondence between an absolute luminance and a conversion color according to Embodiment 3.

In step S309, the color conversion threshold setting unit 108 rearranges the thresholds (luminances) which are set for the color conversion threshold Th1 to the color conversion threshold Th6 in descending order. By the color conversion threshold setting processing in FIG. 8, the color conversion threshold Th1 to the color conversion threshold Th6 are set to 4,000, 2,500, 1,000, 400, 200 and 100 cd/m². FIG. 9 indicates the correspondence between the absolute luminance and the conversion color of the example described in FIG. 8.

According to Embodiment 3 described above, the image processing apparatus 100 analyzes the luminances of the contents and estimates the break points of the scenes based on the maximum luminance FLL in each of a plurality of frames acquired by the analysis. By the estimated break points, the image processing apparatus 100 divides the contents into a plurality of scenes. The image processing apparatus 100 sets the color conversion thresholds for the false color display in accordance with the maximum value MaxFLL of all the FLLs acquired by the analysis and the maximum value of FLLs of the frames included in each scene. Thereby the user can confirm the luminance distribution by the color conversion in accordance with the luminance distribution of the contents which have actually been confirmed.

In Embodiment 3, the color conversion thresholds are set based on the maximum luminance FLL of one of a plurality of frames, but the color conversion thresholds may be set based on the luminance distribution in a predetermined one frame in the contents. The predetermined one frame may be the first frame of the contents, for example. Further, the predetermined one frame may be a first frame of each scene divided by the input image analysis unit 301. In this case, the color conversion threshold setting unit 108 sets the color conversion threshold for each scene.

Here an example of setting the color conversion thresholds based on the luminance distribution in one frame will be described. It is assumed that a number of color conversion thresholds is six, and a number of luminances included in the reference luminances is six. A case where the maximum luminance in one frame is 6,000 cd/m², and the luminance distribution, in the frame as follows, will be described. A surface area of each luminance range may be calculated as a ratio of a number of pixels having a luminance within this luminance range with respect to a number of pixels in the frame.

| | |
|---|---|
| Surface area of 0 to 100 cd/m² | 0% |
| Surface area of 100 to 200 cd/m² | 5% |
| Surface area of 200 to 400 cd/m² | 20% |
| Surface area of 400 to 1,000 cd/m² | 25% |
| Surface area of 1,000 to 6,000 cd/m² | 50% |

The color conversion threshold setting unit 108 sets the color conversion threshold Th1 to 6,000 cd/m², which is the maximum luminance in one frame. Further, the color conversion threshold setting unit 108 sets the four color conversion thresholds Th2 to Th5 to 1,000 cd/m², 400 cd/m², 200 cd/m² and 100 cd/m², which are the reference luminances respectively. Furthermore, the color conversion threshold setting unit 108 may set the unset color conversion threshold Th6 to 3,500 cd/m², which is determined by equally dividing the luminance range 1,000 to 6,000 cd/m², of which surface area ratio is the largest. In this way, the color conversion threshold setting unit 108 can set the color conversion thresholds in accordance with the surface area of each luminance range of the frame included in the contents. In other words, the color conversion threshold setting unit 108 sets the unset color conversion threshold (color conversion threshold of which value is not set) to a luminance to delimit the luminance ranges of which a number of pixels having the luminance in the luminance range not more than the maximum luminance of the contents.

The present invention is applied to various displays (e.g. liquid crystal display) having the false color display function, but may be applied to image processing software to provide the false color display function.

The CPU 105 may control the display unit 104 to display an image that indicates the determined relationship between each luminance range and the conversion color as a legend image. Then the user can refer to the luminance level corresponding to the region of the image by comparing the image, to which the color conversion processing is applied, and the legend image.

While the present invention has been described with reference to the preferred embodiments, the present invention is not limited to these specific embodiments, but includes various modes within the scope not deviating from the essence of the invention. Further, each of the embodiments described above is an exemplary embodiment, and each embodiment may be appropriately combined.

According to the present invention, the luminances included in the image data can be more accurately identified.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-231828, filed on Dec. 11, 2018, which is hereby incorporated by reference herein in its entirety.

What is claimed is:

1. An image processing apparatus, comprising:
   at least one processor and/or at least one circuit to perform operations of the following units:
   an image input unit configured to acquire image data including a plurality of frames;
   a setting unit configured to set a plurality of thresholds to divide a luminance range into sub-ranges, the plurality of thresholds including a maximum luminance which is the highest luminance value among luminance values in the plurality of frames;
   a conversion unit configured to generate a false color image data from each frame by converting colors of the image data into conversion colors that are different depending on each sub-range, based on a correspondence between the conversion colors and the sub-ranges, wherein
   a luminance range more than the maximum luminance corresponds to one sub-range; and
   a luminance range not more than the maximum luminance includes at least two sub-ranges.

2. The image processing apparatus according to claim 1, wherein the setting unit acquires the highest luminance value from metadata attached to the image data.

3. The image processing apparatus according to claim 1, wherein the plurality of thresholds other than the maximum luminance are luminance levels not more than the value of the maximum luminance.

4. The image processing apparatus according to claim 1,
   wherein the image data includes scenes,
   the setting unit acquires the highest luminance value among luminance values in frames which constitute each scene, and
   the plurality of thresholds includes the highest luminance value of each scene.

5. The image processing apparatus according to claim 1, wherein the image data is image signals generated in HDR10 format.

6. The image processing apparatus according to claim 1, further comprising a control unit configured to control a display unit to display a false color image based on the false color image data and a legend image which indicates the correspondence.

7. The image processing apparatus according to claim 1, wherein the setting unit sets a threshold to further divide a widest sub-range among the sub-ranges corresponding to a luminance range not more than the maximum luminance.

8. A control method, comprising:
   an image input step of acquiring image data including a plurality of frames;
   a setting step of setting a plurality of thresholds to divide a luminance range into sub-ranges, the plurality of thresholds including a maximum luminance which is the highest luminance value among luminance values in the plurality of frames;
   a conversion step of generating a false color image data from each frame by converting colors of the image data into conversion colors that are different depending on each sub-range, based on a correspondence between the conversion colors and the sub-ranges, wherein
   a luminance range more than the maximum luminance corresponds to one sub-range; and
   a luminance range not more than the maximum luminance includes at least two sub-ranges.

9. The control method according to claim 8, wherein the highest luminance value is acquired from metadata attached to the image data.

10. The control method according to claim 8, wherein the plurality of thresholds other than the maximum luminance are luminance levels not more than the value of the maximum luminance.

11. The control method according to claim 8,
    wherein the image data includes scenes,
    the highest luminance value among luminance values in frames which constitute each scene is acquired and
    the plurality of thresholds includes the highest luminance value of each scene.

12. The control method according to claim 8, further comprising a control step of controlling a display unit to display a false color image based on the false color image data and a legend image which indicates the correspondence.

13. The control method according to claim 8, wherein the setting unit sets a threshold to further divide a widest sub-range among the sub-ranges corresponding to a luminance range not more than the maximum luminance.

14. A non-transitory computer-readable medium that stores programs, wherein the programs cause a computer to execute:
    acquiring image data including a plurality of frames;
    setting a plurality of thresholds to divide a luminance range into sub-ranges, the plurality of thresholds including a maximum luminance which is the highest luminance value among luminance values in the plurality of frames;

generating a false color image data from each frame by converting colors of the image data into conversion colors that are different depending on each sub-range, based on a correspondence between the conversion colors and the sub-ranges, wherein a luminance range more than the maximum luminance corresponds to one sub-range; and a luminance range not more than the maximum luminance includes at least two sub-ranges.

\* \* \* \* \*